Aug. 12, 1969     R. A. LONG     3,460,305

CERAMIC STRUCTURAL COMPOSITE

Filed July 29, 1963     2 Sheets-Sheet 1

INVENTOR.
ROGER A. LONG
BY
Lyon & Lyon
ATTORNEYS.

United States Patent Office 3,460,305
Patented Aug. 12, 1969

3,460,305
CERAMIC STRUCTURAL COMPOSITE
Roger A. Long, Escondido, Calif., assignor to Whittaker Corporation, Los Angeles, Calif., a corporation of California
Continuation-in-part of application Ser. No. 61,353, Oct. 10, 1960. This application July 29, 1963, Ser. No. 298,388
Int. Cl. E04c 2/04; B28b 7/00
U.S. Cl. 52—604    15 Claims The present invention is a continuation-in-part of my copending application Ser. No. 61,353 filed Oct. 10, 1960, now U.S. Patent No. 3,131,073 issued Apr. 28, 1964.

The present invention relates to structures comprising ceramic composites and the process for producing these structures. More particularly, the present invention relates to ceramic structures comprising ceramic tiles and a ceramic binder in which the binder does not substantially alter the electrical characteristics of the structure from those which it would have if it were fabricated from the tiles alone. The structures of the present invention are also designed for use up to at least 1,000° F.

The mission requirements and performance characteristics of current aircraft and space vehicles and weapons systems are continually demanding more refined and efficient detection and ranging equipment. The most suitable means for housing this equipment has been found to be a "radome" which generally comprises a nose or "bubble" on the aircraft or space vehicle. Radomes have been fabricated from plastics and ceramics. However, since the radomes should compromise the performance of the electromagnetic devices contained therein as little as possible while still offering aerodynamic smoothness and environmental protection, ceramics, with their high temperature stability, resistance to rain erosion and uniform electrical properties are presently considered the most suitable material for the fabrication of radomes.

Unfortunately, it has been found difficult, and sometimes impossible, to produce monolithic ceramic radomes in the sizes and configurations required for optimum vehicle performance because of the non-uniform shrinkage problems usually encountered during sintering operations.

Broadly, the present invention provides a solution to these problems by providing a "mosaic" structure comprising ceramic tiles and a ceramic binder. In order to effectively use this novel concept, ceramic tiles and ceramic binder which permit the fabrication of large, low loss, non-signal distorting radomes which are mechanically and electrically operable at temperatures up to at least 1,000° F. are necessary. In general, the materials from which the radome is fabricated must have a dielectric constant of less than about 5 and a loss tangent of less than about 0.02.

Thus, it is a primary object of the present invention to provide a method which is especially suited for the fabrication of large radomes and the radomes so produced.

It is another object of the present invention to provide a mosaic technique which is especially suited for producing large radomes and the radomes so produced.

It is a further object of the present invention to provide a method of fabricating a composite tile and binder structure which has low loss and non-signal distorting characteristics and which does not undergo mechanical or electrical damage at temperatures up to at least 1,000° F. and the structures so produced.

It is still another object of the present invention to provide a ceramic composite comprising refractory oxide tiles and a binder consisting essentially of eutectic proportions of a metal pyrophosphate and a refractory material having a melting point higher than the metal pyrophosphate and selected from the group consisting of the refractory oxides.

Other objects and advantages of the present invention, it is believed, will be apparent from the following detailed description of specific embodiments thereof when read in connection with the drawings.

Briefly, the present invention comprises a mosaic technique for producing ceramic structures in which ceramic tiles are combined with a binder which preferably consists essentially of eutectic proportions of a metal pyrophosphate and a refractory material having a melting point higher than the metal pyrophosphate and selected from the group consisting of the refractory oxides. These ceramic tiles may comprise any refractory oxide such as quartz, mica, beryllia, silica, alumina, etc. These tiles may be homogeneous or may comprise a mixture of materials. For example, the ceramic tiles may be prepared from finely divided refractory oxides in combination with the eutectic binder described above. This eutectic binder may then also be used to bind the individual tiles together in the composite mosaic structure. The tiles used in the present invention may have any appropriate shape, e.g., they may be square or rhombus-shaped tiles. In addition, it is often desirable to provide the tiles with scarfed edges in order to take advantage of the high shear strength of the binder. More than one layer of tile may be used and, in such cases, reinforcing means, e.g., wire, may be positioned between the layers.

In most cases, the tiles will be formed such that they have a certain amount of curvature in order to make them particularly suitable for forming structures having curved surfaces. However, flat tiles may also be used, particularly when the size of the tile is small. While tiles having scarfed edges possess some strength advantages, it is difficult to form sharp curved edges and to hold tolerances in the curved areas of adjacent segments unless each individual tile is ground to close tolerances. Such grinding, of course, results in substantial increases in costs. Thus, it is preferred to use tiles which are rhombus-shaped which do not have scarfed edges. This design is capable of giving 100% joint efficiency in the longitudinal direction and a somewhat lower efficiency in the circumferential direction. If additional circumferential strength is desired, a multiple layer construction should be used. In general, a double layer construction will provide sufficient circumferential strength. The overlap of the tiles in the adjacent layers should be of sufficient width to utilize the body strength in the circumferential direction which, at a given optimum rhombus angle, will determine the length of the tile. When rhombus-shaped tiles are used, the sharp points thereof may be cut off for ease of handling.

Whether a single or multiple layer structure is used will, of course, depend upon the magnitude of the stresses in the longitudinal and circumferential directions. When the predominant stresses are in the longitudinal direction, the rhombus-shaped tiles should be orientated in this direction, i.e., the major dimension of the rhombus should be aligned with the direction of the longitudinal stresses. The optimum rhombus angle will vary with varying stresses as well as with the dimensions of the rhombus. This optimum angle may be calculated by the routine application of well known physical principles.

Internal pressurization of the structure will require a more efficient joint in the circumferential direction. However, this problem may be eliminated by pressurizing the electromagnetic equipment rather than the entire radome or other similar structure.

It may also be desirable to vary the sizes of the individual tiles in a single structure. For example, in a radome having a conical and ogival shape, it will usually be desirable to gradually reduce the size of the tiles from a maximum at the base of the cone to smaller sizes as the apex is approached. Preferably, the nose cap of the radome is constructed from a one-piece sintered monolithic body. The attaching base diameter of this nose cap should be shaped, e.g., by grinding, to match the faying segment members and bonded to the assembly with the same binder as that used to join the segments.

A variety of manufacturing techniques may be used to produce the mosaic structures of the present invention. For example, the ceramic tiles may be assembled on a male mandrel or firing mold. In such a case, the ceramic binder should be applied to the faying areas of the tiles prior to lay-up. By this method, joint thicknesses can be controlled to meet the circumferential dimension tolerances. Cements which set at room temperature, straps, pads or other supporting means may be used to hold the individual tiles in place during lay-up. Such means may be removed, if necessary, prior to firing. The binders of the present invention may be positioned by using organic binders such as polyvinyl alcohol, methylcellulose, gum arabic, etc., to maintain the segment location until the firing operation sinters the ceramic binder. The fugitive organic binder will completely volatilize upon heating and leave little or no residue.

The use of male molds has many advantages, e.g., lower fabricating costs due to smaller mass and dimensional control, simplification of segment lay-up and support, facilitation of alignment of segments and prevention of collapse during firing. However, care must be taken to provide a male mold which has a diametrical expansion during heating which closely approximates that of the tiles in the mosaic structure. Female molds, although not possessing many of the advantages of male molds, provide one significant advantage in that mold materials having a lower coefficient of thermal expansion, e.g., graphites, carbides, nitrides, than many ceramics, e.g., alumina, can be employed to create a compressive loading which closes the joint gaps. This not only produces a desirable thin bondline, but also compensates for the difference in liquid to solid binder volume.

Preferably, the mold used is easily removable, e.g., collapsible, and reusable. The mold surface should not only be compatible with the firing atmospheric environment, but resistant to the wetting of the ceramic binder and inert to the tile material.

Various firing methods may be used to produce the structures of the present invention. For example, a periodic firebrick kiln in combination with an internal deflector tube may be used. The deflector tube, preferably fabricated from a ceramic, is positioned between the gas burners positioned adjacent to the interior wall of the firebrick kiln and the mosaic assembly. Thus, heat is transmitted to the mosaic assembly by radiation from the deflector tube, rather than by conduction. As a result, temperature gradients are equalized throughout the structure. Female molds may be heated in a similar manner. A larger deflection device and periodic kiln will be required for a mosaic structure having a given size. When a male mold is used, the firing burners may be positioned inside of the male mold. In this case, the kiln functions only as an insulator for maintaining even temperature and controlled cooling rates and the deflection tube may be eliminated.

In general, the firing cycle used to produce the mosaic structures of the present invention will involve heating the mosaic structure to a temperature slightly below that required to flow the ceramic binder, soaking until uniformity is reached throughout the mosaic structure, heating rapidly to about 25–50° F. above the binder bonding temperature, soaking until uniformity is reached and cooling about 200° F. rapidly and then slowly cooling to room temperature. Multiple thermocouples located throughout the structure aid in achieving this firing cycle. The firing atmosphere may be oxidizing, neutral, reducing or inert. In general, cracked natural gas atmospheres, neutral to slightly oxidizing, are preferred.

Ceramic binders which may be used in the present invention are fully described in my copending application Ser. No. 61,353, filed Oct. 10, 1960, now United States Patent No. 3,131,073, the disclosure of which application is incorporated by reference herein. Briefly, such binders comprise eutectic proportions of a metal pyrophosphate and a refractory oxide having a melting point higher than that of metal pyrophosphate. The preferred pyrophosphate is manganese pyrophosphate, but other pyrophosphates such as titanium, iron, zirconium, nickel and the like may be used. Preferably, the metal pyrophosphate and the refractory oxide are first ground into small particles, e.g., less than −200 mesh and then combined to produce the desired eutectic compositions. Among the refractory oxides which may be used are alumina, zirconia, beryllia, titania, chromia, thoria, hafnia and magnesia. The eutectic compositions and eutectic melting temperatures of the binders used in the present invention are set forth in my copending application Ser. No. 61,353.

It has been found that small percentages of certain materials in the pyrophosphate have a considerable effect on the eutectic compositions at various temperatures. Therefore, such impurities should be kept at a minimum to obtain uniformity. However, a predetermined amount of such materials may also be added to adjust the eutectic melting point. One of the most active of such additive materials in manganese pyrophosphate has been found to be the sodium phosphate $Na(PO_3)_3$. The presence of this sodium phosphate has the effect of lowering the eutectic melting point, and additions of between 10 and 20% by weight have been found to be a useful means for effectively lowering the eutectic temperature.

It has been found that the effect of these binders on the electrical properties of the mosaic structure of the present invention is not significant. For example, calculations show that the phase difference of a ray passing through a 0.005 inch thick bondline, as compared with a ray not passing through the bondline, are about 0.8° for perpendicular polarization and about 1.2° for parallel polarization at the assumed incidence angle. Such a small phase error would have a negligible effect on the propagated beam. It is difficult to precisely analyze the effects of the bondlines, but it is clear from the above considerations that they will be negligible. In addition, the joint lines in the mosaic structure will tend to be uniformly distributed over the beam and will not tend to disturb the pattern.

In order to obtain the desired emissivity of the mosaic structure of the present invention, e.g., an emittance of above 0.9, surface modification of the ceramic used in the mosaic structure may be required. For example, the normal emittance of alumina is about 0.7 at room temperature and decreases rapidly to about 0.5 at temperatures above 1,000° F. One method of modifying a surface to obtain a high emissivity is through the use of a dark pigmented glaze containing high emissivity particles which do not fuse upon firing. Such a coating could be applied to the tiles to be used in producing the mosaic structure of the present invention or could be applied to the completed structure. Among the materials which could be used to produce a high emissivity coating are the silicates and oxides of iron, cobalt, chromium, manganese and nickel. The thickness of such a coating should, of course, be controlled such that it does not interfere with the electrical requirements and dielectric characteristics of the mosaic structure.

Referring now to the drawings, FIGURE 1 illustrates a portion of a double layer mosaic structure in which rhombus-shaped tiles have been used.

Figure 1:
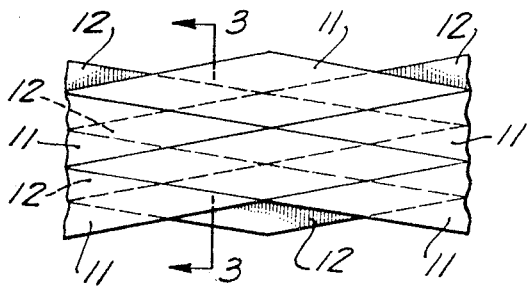
Figure 3:
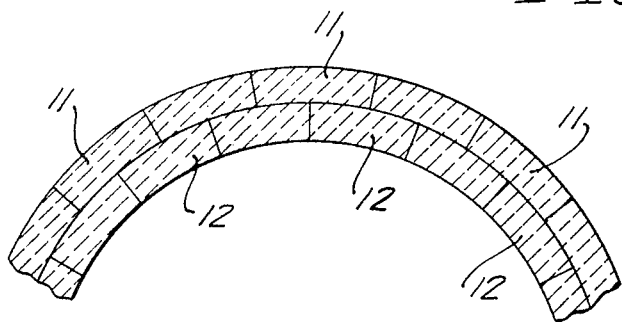
FIGURE 3 is a cross-sectional view taken on line 3—3 of FIGURE 1.

The double layer structure illustrated in FIGURE 1 comprises a plurality of rhombus-shaped tiles 11 which comprise a first layer and a second layer of rhombus-shaped tiles 12. As shown more clearly in FIGURE 3, these tiles are arranged such that there is a substantial overlap between the first and second layers. The bondlines between these tiles comprise the eutectic binder of the present invention.

Figure 2:
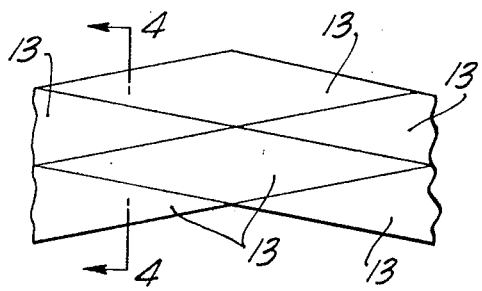
FIGURE 2 illustrates a portion of a single layer mosaic structure in which rhombus-shaped tiles have been used.
Figure 4:
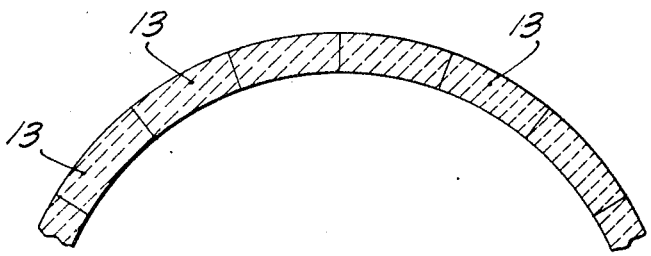
FIGURE 4 is a cross-sectional view taken on line 4—4 of FIGURE 2.

The single layer structure illustrated in FIGURE 2 is substantially similar to that illustrated in FIGURE 1 with the exception of the absence of a second layer. FIGURE 4 is a cross-sectional view of the tiles 13 illustrated in FIGURE 2.

Figure 5:
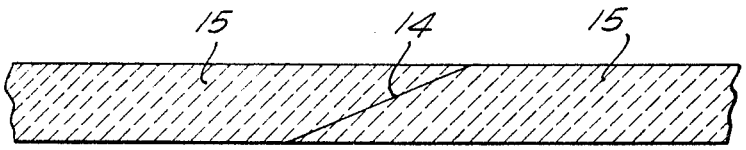
FIGURE 5 illustrates a side view of a portion of a mosaic structure in which the titles are connected by a scarfed joint.

FIGURE 5 illustrates a scarfed joint 14 between tiles 15. This type of joint is often desirable since it permits the mosaic structure to take greater advantage of the high shear strength of the binder. However, it is to be understood that other types of joints, e.g., tongue and groove, dovetail, curved, tapered, etc., may be used in the present invention.

Furthermore, the walls of the mosaic structures of the present invention may have a varying thickness if desired. Varying wall thickness may be obtained by using tiles having different thicknesses, tiles having tapered cross-sections or different numbers of layers of tiles.

Figure 6:
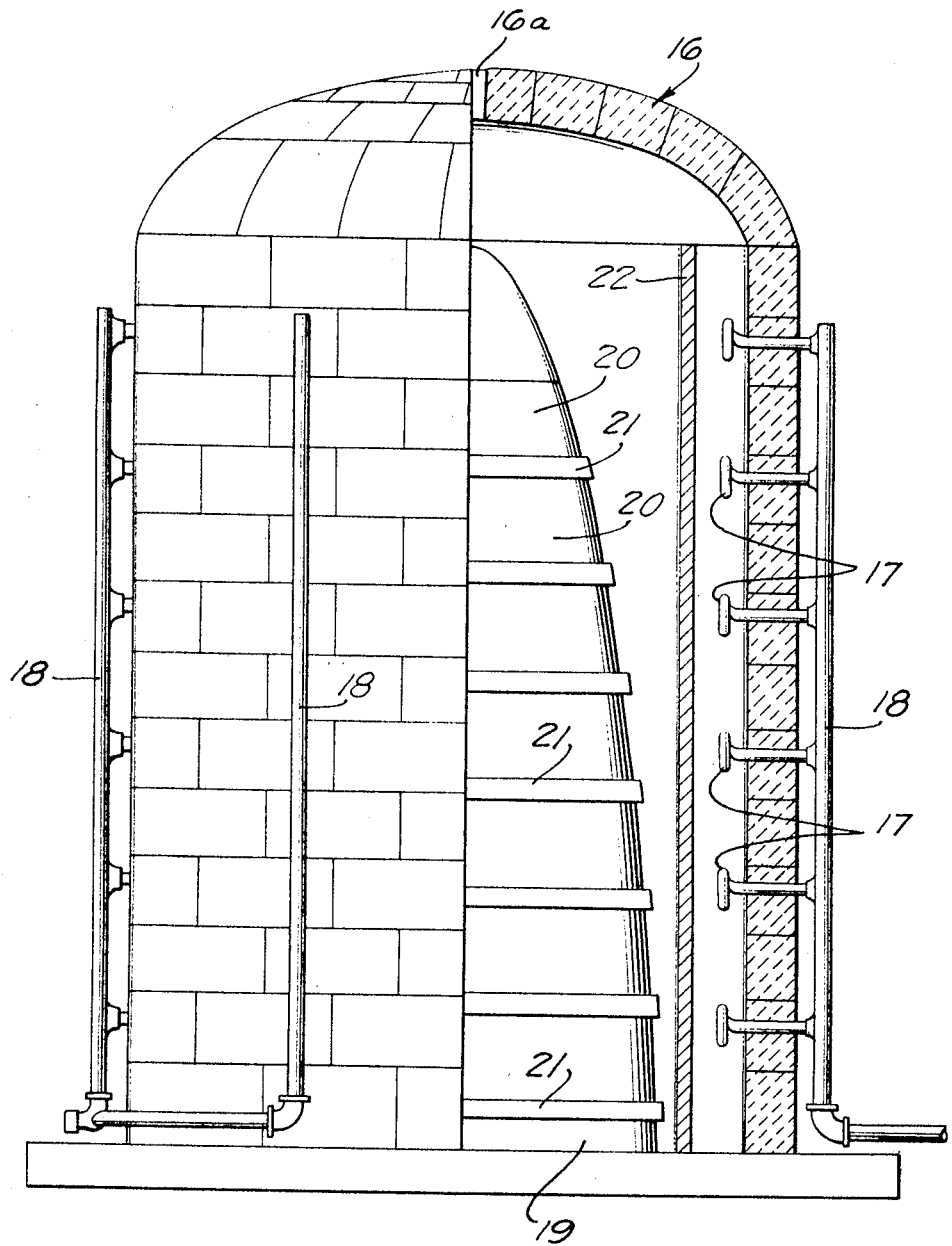
FIGURE 6 illustrates an apparatus which may be used to produce the mosaic structure of the present invention.

FIGURE 6 illustrates an apparatus suitable for practicing the process of the present invention. This apparatus comprises kiln 16 which has a vent 17 in the top thereof. The walls of kiln 16 are provided with burners 17 which are connected to a fuel source by manifold 18. A mold having base 19 is positioned in kiln 16 and supports tiles 20. As previously described, a binder is provided in the joints between tiles 20. Tiles 20 are further supported on the mold by straps 21. A deflector wall or tube 22 is positioned between burners 17 and tiles 21. As previously described, deflector 22 functions to distribute the heat generated by burners 17 and causes the tiles 20 to be heated by radiation rather than conduction.

In operation, the tiles and binder are first arranged on the mold and secured in place by straps 21. Deflector tube 22 is then positioned around the assembled tiles and the kiln and burners are brought into position around deflector 22. The burners are then caused to generate sufficient heat to effectively bond the tiles and the bonded structure is allowed to cool.

A preferred embodiment of the present invention comprises a mosaic structure comprising tiles prepared from fused alumina powder having a 99% purity and a binder comprising a eutectic composition comprising 12.5% titania and 87.5% manganese pyrophosphate.

It will be readily apparent to those skilled in the art that the foregoing illustrations of the present invention may be modified in several ways without departing from the scope of the invention. For example, as additional ceramic cements and binders are developed which will effectively wet refractory oxide ceramics and which will not interfere with the electrical and mechanical properties of the structure, they may be used in place of the pyrophosphate eutectic binders specifically described herein. In addition, the mosaic structures of the present invention may be of any size or shape and may comprise individual tiles having a wide variety of sizes and shapes.

I claim:

1. A mosaic structure comprising a plurality of tiles secured together by a binder, said tiles comprising at least one refractory oxide, and said binder comprising a eutectic consisting essentially of a metal pyrophosphate and a refractory material having a melting point higher than said metal pyrophosphate and selected from the group consisting of the refractory oxides, said binder having a melting temperature lower than that of said tiles.

2. A mosaic structure comprising a plurality of tiles, said tiles being bonded together by a binder comprising a eutectic consisting essentially of a pyrophosphate of a metal selected from the group consisting of manganese, titanium, iron, zirconium, and nickel and a refractory oxide selected from the group consisting of alumina, zirconia, beryllia, titania, magnesia, chromia, thoria, and hafnia, said binder having a melting temperature lower than that of said tiles, said tiles having a composition selected from the group consisting of a fused refractory oxide, and a fused mixture of refractory oxide and a eutectic consisting essentially of a metal pyrophosphate and a refractory oxide material having a higher melting point than said metal pyrophosphate.

3. The structure of claim 2 wherein said tile comprises a fused refractory oxide selected from the group consisting of quartz, mica, beryllia, silica, and alumina.

4. The structure of claim 2 wherein said tile comprises a finely divided refractory oxide filler bonded by said binder.

5. The structure of claim 2 wherein said tiles are rhombus-shaped.

6. The structure of claim 2 wherein said tiles are connected by scarfed joints.

7. The structure of claim 2 wherein said tiles are arranged in a plurality of layers.

8. The structure of claim 7 wherein reinforcing wire is positioned between at least two of said layers.

9. The structure of claim 2 wherein the surface of said structure is provided with a coating which increases the emissivity thereof.

10. The structure of claim 9 wherein said coating comprises a material selected from the group consisting of the silicates and oxides of iron, cobalt, chromium, manganese and nickel.

11. The structure of claim 2 wherein said binder comprises manganese pyrophosphate and contains between about 10% to about 20% by weight $Na(Po_3)_3$.

12. A mosaic structure comprising a plurality of tiles, said tiles being bonded together by a binder comprising a eutectic consisting essentially of a metal pyrophosphate and a refractory material having a melting point higher than said metal pyrophosphate and selected from the group consisting of the refractory oxides, said binder having a melting temperature lower than that of said tiles, said tiles having a dielectric constant of less than about 5, a loss tangent less than about 0.02, and a composition selected from the group consisting of a fused refractory oxide, and a fused mixture of a refractory oxide and a eutectic consisting essentially of a metal pyrophosphate and a refractory oxide having a melting point higher than said metal pyrophosphate.

13. A process comprising forming a mosaic structure comprising arranging a plurality of tiles in abutting relationship in a predetermined pattern, said tiles comprising at least one refractory oxide, providing a binder having a melting temperature lower than that of said tiles and comprising a eutectic consisting essentially of a metal pyrophosphate and a refractory material having a melting point higher than said pyrophosphate and being selected from the group consisting of the refractory oxides between said tiles, heating said tiles and binder to a temperature sufficient to melt said binder, but insufficient to melt said tiles, and allowing said tiles and binder to cool, whereby said tiles are secured together by said binder.

14. A process comprising forming a mosaic structure comprising arranging a plurality of tiles in abutting relationship in a predetermined pattern, said tiles comprising at least one refractory oxide, providing a binder having a melting temperature lower than that of said tiles and comprising a eutectic consisting essentially of a metal pyrophosphate and a refractory material having a melting point higher than said pyrophosphate and being selected from the group consisting of the refractory oxides between said tiles, heating said tiles and binder to a first temperature slightly below that required to cause the binder to flow, maintaining said tiles and binder at said first temperature until a uniform temperature is achieved, heating rapidly to a second temperature in the range of from about 25° F. to about 50° F. above the flow temperature of said binder, but below the melting temperature of said tiles, maintaining said second temperature until a uniform temperature is achieved, cooling about 200° F. rapidly and then slowly cooling to room temperature whereby said tiles are secured together by said binder.

15. A process comprising forming a mosaic structure comprising arranging a plurality of tiles in abutting relationship in a predetermined pattern in a female mold having a lower coefficient of thermal expansion than said tiles, said tiles comprising at least one refractory oxide, providing a binder having a melting temperature lower than that of said tiles and comprising a eutectic consisting essentially of a metal pyrophosphate and a refractory material having a melting point higher than said pyrophosphate and being selected from the group consisting of the refractory oxides between said tiles, heating said tiles and binder to a temperature sufficient to melt said binder, but insufficient to melt said tiles, and allowing said tiles and binder to cool, whereby said mold exerts a compressive force which tends to force said tiles together, said tiles being secured together by said binder upon cooling thereof.

References Cited

UNITED STATES PATENTS

| | | | |
|---|---|---|---|
| 3,030,228 | 4/1962 | Hernandez et al. | 117—123 |
| 3,131,073 | 4/1964 | Long | 106—39 |
| 3,184,370 | 5/1965 | Luks | 106—55 |

OTHER REFERENCES

Skeist: Handbook of Adhesives, Reinhold Publishing Co., 1962, p. 203.

ROBERT F. BURNETT, Primary Examiner

ROGER H. CRISS, Assistant Examiner

U.S. Cl. X.R.

52—249, 575; 106—39, 55; 161—37; 343—872